United States Patent [19]
Hurst, Jr. et al.

[11] 3,974,711
[45] *Aug. 17, 1976

[54] STICK SHIFT ASSEMBLY

[75] Inventors: George H. Hurst, Jr., Jenkintown; James F. Hobbins, Philadelphia, both of Pa.

[73] Assignee: Hurst Performance, Inc., Warminster, Pa.

[ * ] Notice: The portion of the term of this patent subsequent to May 20, 1986, has been disclaimed.

[22] Filed: Jan. 20, 1970

[21] Appl. No.: 4,208

[52] U.S. Cl............................ 74/473 R; 74/473 P; 74/476
[51] Int. Cl.² ..................... G05G 9/12; G05G 5/10
[58] Field of Search ............ 74/476, 473 R, 473 P, 74/475, 477

[56] References Cited
UNITED STATES PATENTS

| | | |
|---|---|---|
| 1,727,646 | 9/1929 | Hunt et al............................ 74/476 |
| 1,896,893 | 2/1933 | Hartsock ........................... 74/473 P |
| 2,040,594 | 5/1936 | Bixby ............................... 74/476 X |
| 2,136,697 | 11/1938 | Lapsley ........................... 74/473 P |

Primary Examiner—Allan D. Herrmann
Attorney, Agent, or Firm—Coffee and Sweeney

[57] ABSTRACT

The gear shift stick assembly permits shifting in four forward speeds and reverse. It includes a trigger located near the gear shift knob which may be pulled up or down while the stick is being shifted in position. A wire runs from the trigger down through the stick and engages a generally hat-shaped stop sleeve. When the trigger is not operated, the stop sleeve is in its lower position and abuts a fixed stop member that is mounted in the shift assembly in a position to prevent movement of the stick into the reverse gear-actuating position. If the stick is not in the third-fourth gear slot and the trigger is raised, the stop sleeve comes into the path of another stop member preventing movement of the stick toward the third-fourth gear slot.

6 Claims, 10 Drawing Figures

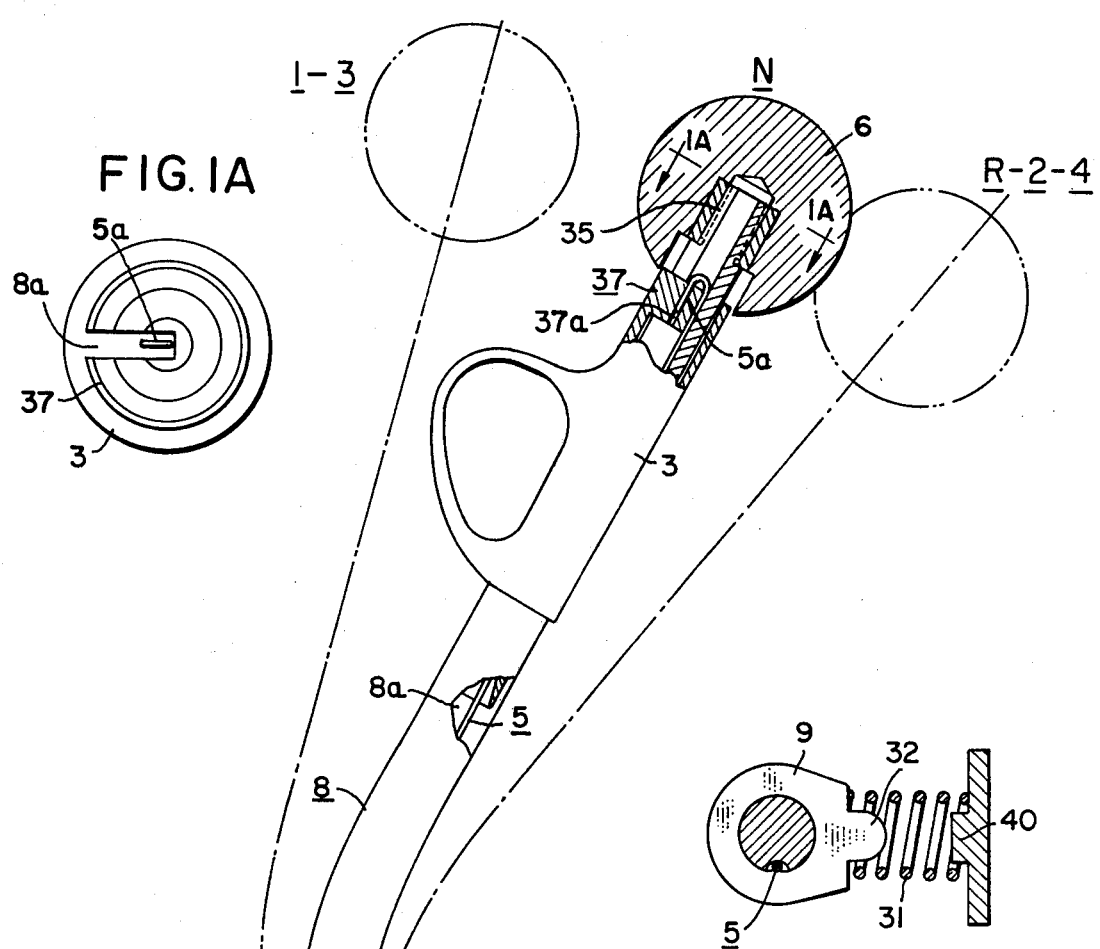
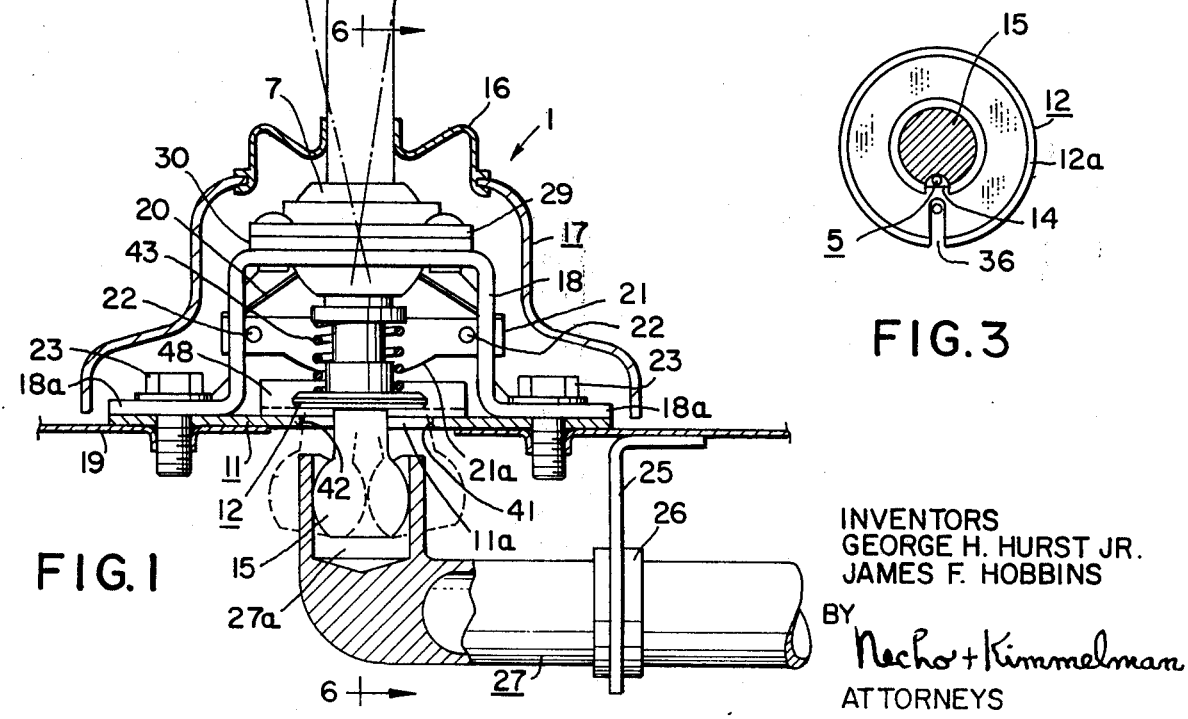
FIG. 1A
FIG. 1
FIG. 2
FIG. 3
INVENTORS
GEORGE H. HURST JR.
JAMES F. HOBBINS
BY Necho + Kimmelman
ATTORNEYS

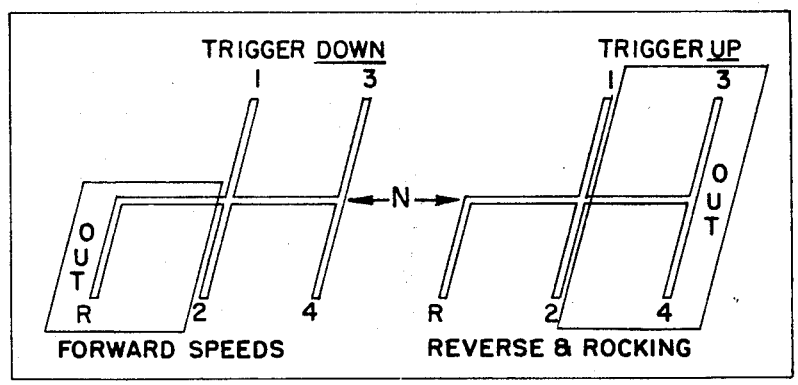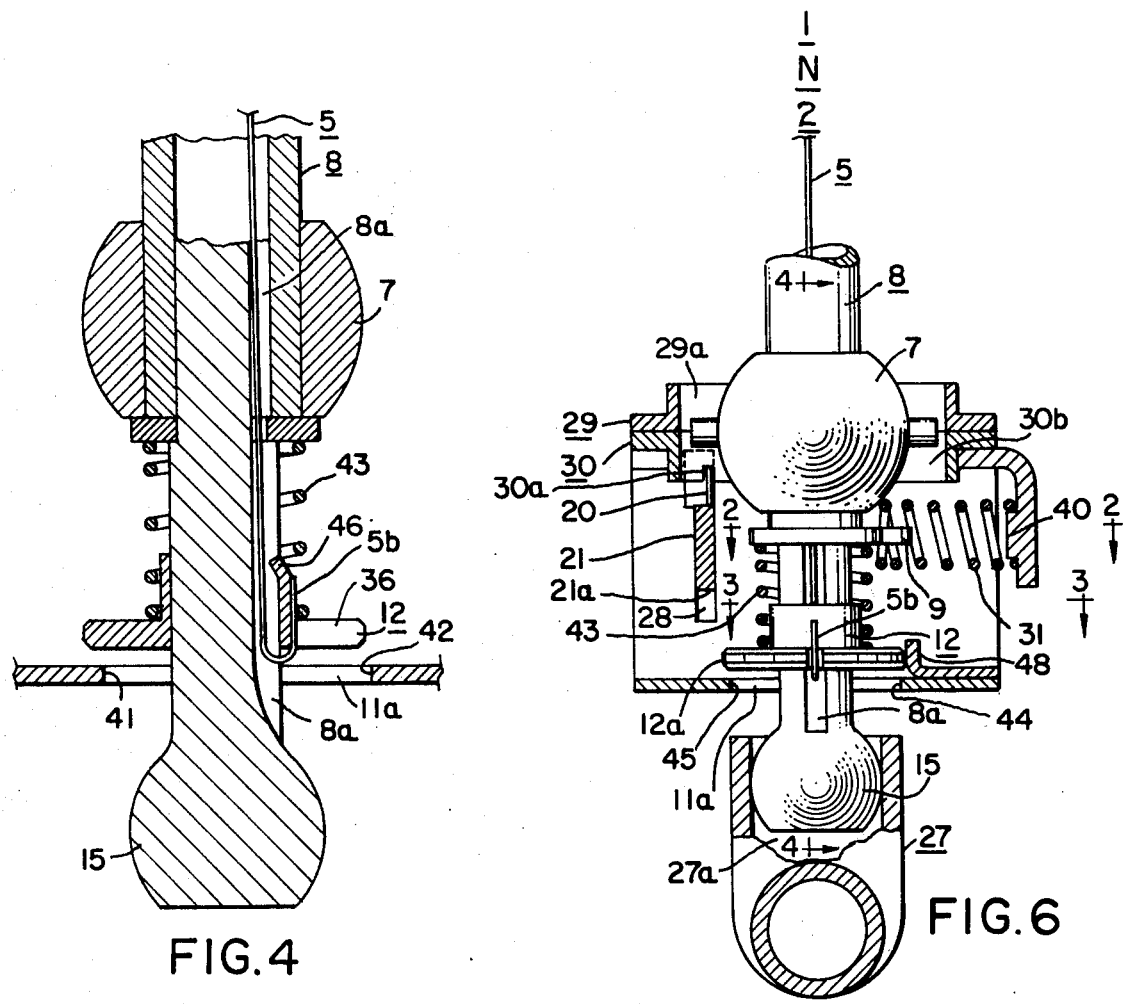

INVENTOR
GEORGE H. HURST JR.
JAMES F. HOBBINS

BY Necho + Kimmelman
ATTORNEY ized to rock the car by shifting from reverse to first or second gear position and then back again. To prevent accidental shifting into third or fourth gear, the trigger 3 is pulled up by the operator as he moves the stick.

STICK SHIFT ASSEMBLY

BACKGROUND OF THE INVENTION

This invention relates to gear shift stick asemblies and in particular to such an assembly wherein certain gear-actuating positions can be selectively prevented to facilitate rocking the car or preventing inadvertent shifting to reverse when shifting between forward gear positions.

It is desirable to provide a gear shift stick assembly which facilitates rocking the car to dislodge it from snow, ice, or mud and prevents inadvertent movement of the shift to third or fourth gear which would cause stalling.

It is also desirable that, during shifting into and between the forward gear positions, there by no possibility of accidentally shifting into reverse.

A gear shift stick assembly which has its extent of travel limited by fixed stop means in all directions would give the operator the feeling of positive control and crispness and would prevent strain on the vehicle's linkage and transmission components.

It is therefore among the objects to provide apparatus which prevents accidental shifting into reverse gear when forward gear positions are desired, prevents engagement of third and fourth gears when the car is being rocked and gives the driver a feeling of positive and crisp control by its positive stick movement limiting action.

BRIEF SUMMARY OF THE INVENTION

The shift stick assembly comprises (a) a shift stick mounted for movement in a plurality of predetermined positions for actuating selected gears, (b) stop means, and (c) means associated with the stick and movable to at least one vertical position in which it cooperates with the stop means to prevent the stick from moving into at least one of said gear actuating positions and also movable to another vertical position in which said stick is enabled to move into said prohibited position. In one form of the invention when the (c) means is moved to the other vertical position the (c) means cooperates with other stop means to prevent the stick from moving into selected other ones of said plurality of predetermined positions.

BRIEF DESCRIPTION OF THE DRAWINGS

FIG. 1 is a vertical section taken down the middle of the shifter mechanism constructed in accordance with the present invention, and with the trigger in the "down" position.

FIG. 1a is a sectional view taken along the line 1a—1a of FIG. 1 in the direction indicated.

FIG. 2 is a sectional view taken along the line 2—2 of FIG. 6 in the direction indicated.

FIG. 3 is a sectional view taken along the line 3—3 of FIG. 6 in the direction indicated.

FIG. 4 is an enlarged fragmentary sectional view taken along the line 4—4 of FIG. 6 in the direction indicated with the trigger in the down position.

FIG. 5 is a chart showing the possible modes of operation or movement of the stick in the trigger "up" and "down" positions.

FIG. 6 is a fragmentary rear elevation view, partly broken away showing the shifter stick in the trigger down position, in neutral.

DETAILED DESCRIPTION OF THE DRAWINGS

Figure 7:
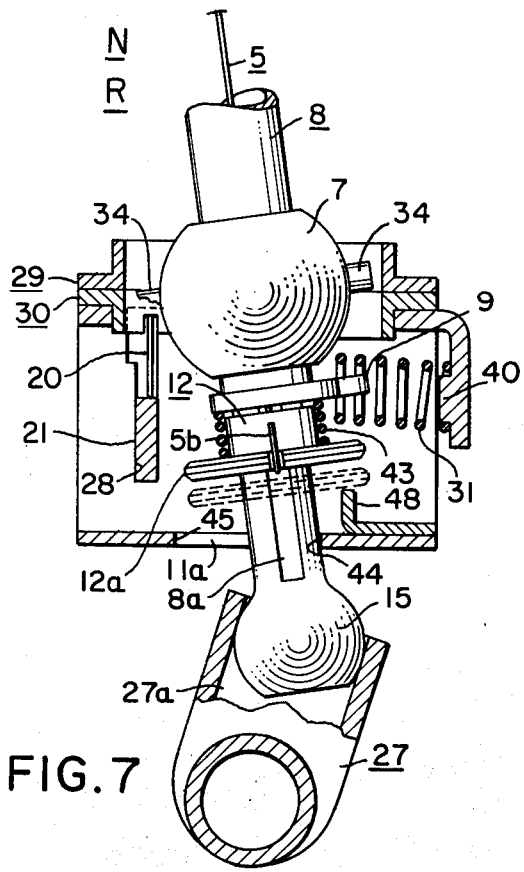
FIG. 7 is a sectional view similar to FIG. 6 and partly in phantom, but showing the stick in the trigger up position and shiftable to reverse gear position.
Figure 8:
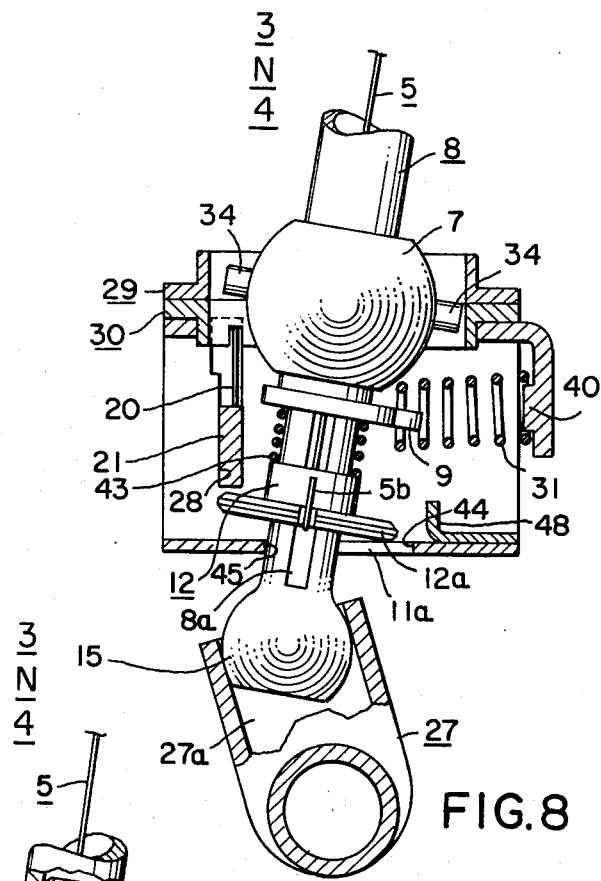
FIG. 8 is a sectional view similar to FIG. 7 with the trigger down, the shift stick in neutral position and movable to third and fourth gear.

Referring to the drawings, there is shown generally at the numeral 1 a gear shift assembly which includes a shifter stick indicated generally at the numeral 8 which passes through a flexible boot 16 that keeps dirt and dust sealed out of the generally bell-shaped cover 17 made of plastic or other semi-rigid material. The top of the stick is surmounted by a spherical knob 6 and below it is located a trigger 3. Associated with the stick 8 is a swivel ball 7 disposed within apertures in horizontal housing members 29 and 30, the latter members being secured by bolts or rivets, for example, to a generally inverted U-shaped mounting bracket 18 which has a circular opening in its top horizontal surface for the swivel ball 7. The mounting bracket 18 has flanges 18a which are bolted by bolts 23 as shown with an apertured stop-plate 11 having a central opening 11a to the floor 19 of the vehicle. The shift stick 8 terminates in a generally bulbous bottom portion 15 which engages an upturned tubular socket portion 27a of a gear shift driving or torque tube indicated generally at 27. The tube 27 passes through a sleeve bearing 26 mounted within a bearing bracket 25 that is fixed to the floor 19 of the vehicle. As will be seen in phantom in FIG. 1 the stick 8 is movable in the plane of the drawing and also transversely thereto. In the most counterclockwise position of the stick (shown in phantom) it can activate first and third gear positions. In its most clockwise position (shown in phantom) it can move into second, fourth and reverse gear actuating positions. In the intermediate position illustrated in solid lines it is in the horizontal neutral channel leading to the reverse, first-second, and third-fourth gear slots. See FIG. 5.*

\* FIG. 5 is a generally schematic reproduction. Actually the reverse, first-second, and third-fourth gear "slots" can be exactly perpendicular to the neutral (horizontal) slot.

In accordance with the present invention, the trigger 3, when in the normal down position, operates a mechanism which prevents engagement of the reverse gear by the stick 8, but enables engagement of any of the four forward gears. When the operator pulls the trigger up, the stick is prevented from engaging the third and fourth gears but is enabled to engage reverse, first and second gears. The mechanism for accomplishing this will now be explained.

TRIGGER OPERATION — THIRD AND FOURTH GEAR PREVENTION

Under certain circumstances, i.e., snow, ice or mud conditions, it is desired to rock the car by shifting from reverse to first or second gear position and then back again. To prevent accidental shifting into third or fourth gear, the trigger 3 is pulled up by the operator as he moves the stick.

The trigger 3 is fixedly connected by a wire 5 to a generally hat-shaped stop sleeve member 12 that is disposed for axial vertical movement along the stick shaft between the lower bulbous portion 15 and the swivel ball 7. The upper end 5a of the wire 5 is looped over and fits within a longitudinal passageway 37a in the tongue 37 of the trigger 3 which rides in a longitudinal slot 35. The wire 5 passes down through a passageway 8a formed in the stick and its lower end 5b is bent back and passed through a slot 36 (FIG. 3) in the base or "brim" 12a of the sleeve 12. The generally hat-shaped stop sleeve 12 has a central opening in its top permitting it to ride up and down the stick. The sleeve 12 also has a bent-inward portion 46 which rides in the passageway 8a to prevent rotation of the sleeve.

When the trigger 3 is raised, the wire 5 will pull the sleeve 12 upward against the normal downward bias exerted by helical spring 43 located between the brim 12a and a horizontal spring hanger 9 that is fixed to the stick. Hanger 9 has a tongue 32 (FIG. 2) which is inserted within a horizontal bias spring 31 whose outer end is mounted over inward projection 40 of the housing 18. This bias spring 31 provides lateral biasing of the lower portion of the stick 8 through neutral toward the third and fourth gear positions. Also, when the stick moves fore or aft from the neutral channel (i.e., transverse to the plane of the drawing, FIG. 6) it provides "toggle" force to the lower portion of the stick. The motion of the stick is limited (see FIG. 1) in its fore movement (first and third gear positions) by edge 41 in the stop plate 11 whereas its aft (second and fourth gear positions) movement is limited by edge 42. Lateral motion of the stick into the reverse slot is limited by edge 44 (FIG. 7) whereas movement toward the right side into the third-fourth gear slot is limited by edge 45. Edges 41, 42, 44 and 45 (FIG. 9) define the opening 11a in the stop plate 11. The ball 7 is equipped with pins 34 which ride in slots 29a and 30b formed in members 29 and 30.

To prevent engagement of the third and fourth gear positions by the stick, a stop member 21 is disposed in the path of the sleeve 12 when it is raised by the trigger. Stop 21 is a vertical bar having a central portion 21a of its lower edge curved downwardly. It also has two projections 22 for limiting its axial horizontal movement out of the two opposed slots 28 formed in the bracket 18 in which it is vertically movable. Ordinarily, the stop member 21 is urged downwardly by the action of an inverted W-shaped spring 20 which is positioned with its extremities in the slots 28 and its upper middle portion resting in the slot 39 formed in the lower swivel ball housing member 30.

When the trigger 3 pulls stop sleeve 12 up as shown in FIG. 7 it will be seen that the stick cannot be pivoted clockwise in the plane of the page past the straight up and down position. This occurs because the brim 12a will engage the inward vertical surface of the stop member 21 which is urged to its lowest position. However, when the sleeve 12 has been pulled up, it is above the upper edge of the reverse-preventing stop 48 so that the stick can nevertheless be moved into reverse, first or second positions.

If the stick is in the angled (reverse) position shown in FIG. 7 and the trigger is released, the stop sleeve 12 as shown in phantom, will come to rest on the upper edge of the reverse-preventing stop 48. However, from that position, the stick can be moved into neutral or any of the four forward gear positions (after sleeve 12 goes to its downmost position when stick 8 goes to its straight up and down position).

Figure 9:
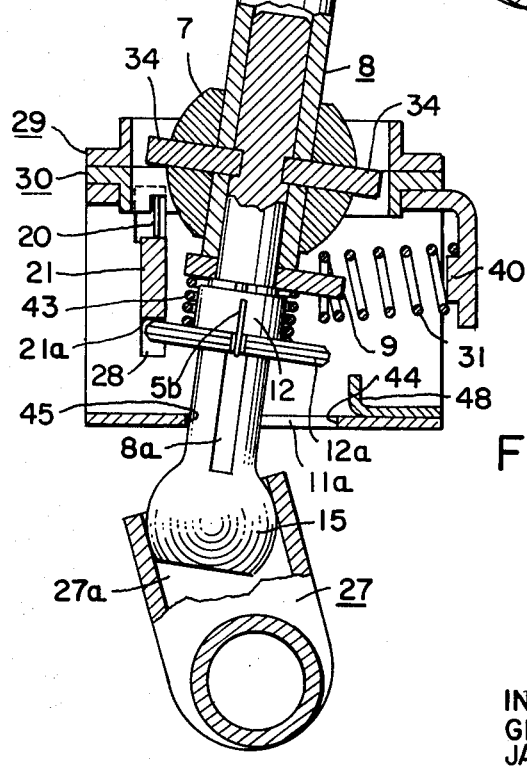
FIG. 9 is a sectional view similar to FIG. 8 with the trigger having been raised to the up position after the stick has moved into the third-fourth gear position.

If the trigger is released when the stick is in its vertically upright condition as shown in FIG. 6 the stick can be moved into the first and second gear slot or moved clockwise in the plane of the drawing to the third-fourth gear slot or into the neutral channel between those slots. Even if the trigger is raised when the stick is in the third-fourth gear slot as shown in FIG. 9, it is possible to move the stick forward and backward into third or fourth gear since the brim 12a will ride on the curved edge 21a. The stop member 21 will merely be urged upwardly within the slot 28 against the downward bias exerted by spring 20.

TRIGGER OPERATION—REVERSE PREVENTION

When the operator is shifting the stick into the four possible forward gear positions, it is desirable to prevent any inadvertent shifting of the stick into reverse. In the present invention, this is accomplished by providing that the trigger 3 in its normal down position, actuates a mechanism preventing movement of the shift in the neutral slot toward the left into the reverse slot. The stop sleeve 12 is shown in its down position in FIGS. 1, 4, 6 and 8. In this down position it will be seen that the brim 12a of the sleeve 12 is limited in movement by the reverse-preventing stop member 48 which is an essentially L-sectioned member fastened to the stop plate 11. Thus, as shown in FIG. 6, it is impossible to move the shift stick counter-clockwise in the plane of the page but the shift can be moved transverse to the plane of the page and clockwise as well enabling engagement of first, second, third and fourth gears.

While the invention has been explained in the terms of the embodiments shown, it should be appreciated that its essence may be incorporated in other embodiments also. Consequently, it is desired that this invention be limited solely by the claims herein.

We claim:
1. A gear shift stick assembly mechanism adapted to be coupled to a plurality of gears including reverse, first, second, third and fourth, comprising:
   a. a shift stick mounted for movement into a plurality of predetermined gear positions for actuating selected ones of said gears;
   b. first stop means for preventing movement of said shift stick into reverse gear position;
   c. a hat-shaped elevatable member disposed toward the base of and operatively connected to said stick, and movable to a plurality of vertical positions;
   d. actuating means mounted on said shift stick manually engagable while said stick is being shifted and including a trigger mechanism disposed near the top of said stick;
   e. second stop means disposed above said first stop means;
   f. coupling means comprising a wire connected between said trigger mechanism and said hat-shaped elevatable member, to enable said elevatable member to be raised from a lower vertical position into an upper vertical position when said actuating means is raised and to be lowered in unison therewith, and urging means normally urging said elevatable member to said lower vertical position; and
   g. wherein said first stop means cooperates with said elevatable member when in said lower position to prevent movement of said stick into said reverse gear position while permitting movement into selected other positions, and wherein said second stop means prevents movement of said stick into third and fourth gear positions when said elevatable member is raised to said upper position where it is clear of said first stop means and said stick is enabled to move into reverse, first and second gear actuating positions.

2. A gear shift stick assembly mechanism adapted to be coupled to a plurality of gears including reverse, first, second, third and fourth, comprising:
   a. a shift stick mounted for movement into a plurality of predetermined gear positions for actuating selected ones of said gears;
   b. first stop means fixed in position, for preventing movement of said shift stick into reverse gear position;
   c. an elevatable member disposed toward the base of and operatively connected to said stick, and movable to a plurality of vertical positions;
   d. actuating means mounted on said shift stick manually engagable while said stick is being shifted and including a trigger mechanism disposed near the top of said stick;
   e. coupling means coupling said actuating means and saidelevatable member, to enable said elevatable member to be raised from a lower vertical position into an upper vertical position when said actuating mechanism is raised and to be lowered in unison therewith, and urging means normally urging said elevatable member to said lower vertical position, said first stop means preventing movement of said stick into said reverse gear actuating position when said elevatable means is in said lower vertical position; and
   f. second vertically movable stop means disposed in the path of said elevatable member when said elevatable member is in said upper vertical position, thereby preventing movement of said stick into third and fourth gear actuating position.

3. The assmbly according to claim 2 wherein said positionally fixed stop means is disposed substantially vertically and wherein said second stop means is disposed for vertical movement in vertical slots and is normally biased to its most downward position.

4. The assembly according to claim 3 wherein said stick is movable forward, backward and laterally from side to side and wherein said fixed stop means is located to one side of said stick and said second stop means is located on the opposite side.

5. A gear shift stick assembly mechanism adapted to be coupled to a plurality of gears including reverse and at least four forward gears, comprising:
   a. a shift stick mounted for movement into a plurality of predetermined gear positions for actuating respective ones of said gears;
   b. actuating means operatively connected to said shift stick and having an elevatable member movable axially with respect to said shift stick, said elevatable member being movable to at least a first position and a second position;
   c. first stop means fixed in position to cooperate with said elevatable member when in said first vertical position to prevent said shift stick from being moved into reverse gear position; and
   d. second stop means, being restricted in movement normal to the axis of said shift stick and movable in a plane parallel to the axis of said shift stick, and cooperating with said elevatable member when in said vertical position to prevent said stick from being moved to third and fourth gear positions.

6. The apparatus as described in claim 5, comprising a spring member to normally hold said second stop means in a lower position, and wherein said elevatable member is movable to said second vertical position while said stick shift is in the third or fourth gear positions.

* * * * *

UNITED STATES PATENT OFFICE
CERTIFICATE OF CORRECTION

Patent No. 3,974,711  Dated  August 17, 1976

Inventor(s) George H. Hurst et al

It is certified that error appears in the above-identified patent and that said Letters Patent are hereby corrected as shown below:

In the first column of the Caption for the original patent herein, the second line behind the heading "Notice", change the date "May 20, 1986" to --December 17, 1991--.

Column 5, line 23 (claim 2), "saidelevatable" should be changed to --said elevatable--.

Signed and Sealed this

Twenty-third Day of November 1976

[SEAL]

Attest:

RUTH C. MASON
*Attesting Officer*

C. MARSHALL DANN
*Commissioner of Patents and Trademarks*